United States Patent
Kamiya et al.

(10) Patent No.: US 7,419,285 B2
(45) Date of Patent: Sep. 2, 2008

(54) INDICATOR LAMP FOR VEHICLE INTERIOR

(75) Inventors: Takayuki Kamiya, Aichi-ken (JP); Hideki Kokubu, Aichi-ken (JP); Yukiko Marui, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 235 days.

(21) Appl. No.: 11/389,181

(22) Filed: Mar. 27, 2006

(65) Prior Publication Data

US 2006/0221626 A1 Oct. 5, 2006

(30) Foreign Application Priority Data

| Mar. 29, 2005 | (JP) | ............................... 2005-094178 |
| Nov. 30, 2005 | (JP) | ............................... 2005-345480 |

(51) Int. Cl.
*B60Q 1/00* (2006.01)
*B60Q 1/26* (2006.01)

(52) U.S. Cl. ......................... 362/488; 362/511; 362/545

(58) Field of Classification Search .................. 362/511, 362/602, 612, 488
See application file for complete search history.

(56) References Cited

U.S. PATENT DOCUMENTS

| 5,027,258 | A | * | 6/1991 | Schoniger et al. ............ 362/629 |
| 5,441,339 | A | * | 8/1995 | Mathias et al. .............. 362/490 |
| 6,955,459 | B2 | * | 10/2005 | Mochizuki et al. ........... 362/602 |
| 2006/0215414 | A1 | * | 9/2006 | Lauber ........................ 362/511 |

FOREIGN PATENT DOCUMENTS

| JP | 11-105547 | 4/1999 |
| JP | 2001-180373 | 7/2001 |
| JP | 2004-161131 | 6/2004 |

* cited by examiner

*Primary Examiner*—Sandra O'Shea
*Assistant Examiner*—James W Cranson
(74) *Attorney, Agent, or Firm*—McGinn IP Law Group, PLLC

(57) ABSTRACT

The invention is an indicator lamp for warning signal to a person who approaches the vehicle to steal a vehicle. The indicator lamp includes a lamp unit including a light emitting diode (LED). The indicator lamp includes a light guide including an elongated portion and a cover portion. The elongated portion receives a light from the LED at one end and conveys the light to a light emitting end. The cover portion covers the LED of the lamp unit and is integrally formed with the elongated portion. The light guide connects with the lamp unit at the cover portion. The indicator lamp prevents rainwater from the top from entering the lamp unit.

20 Claims, 11 Drawing Sheets

INDICATOR LAMP FOR VEHICLE INTERIOR

CROSS REFERENCE TO RELATED APPLICATION

This application is based on and incorporates by references Japanese Patent Application No. 2005-094178, which was filed on Mar. 29, 2005, and No. 2005-345480, which was filed on Nov. 30, 2005.

BACKGROUND OF THE INVENTION

The present invention relates to an indicator lamp for a vehicle interior, and specifically relates to the indicator lamp that enables to be attached to a door trim where rainwater can be fallen.

An indicator lamp is installed in a device of the vehicle interior. The indicator lamp indicates status information of the device, such as setting information, an on/off information or an abnormal information. The device is mainly located in an instrument panel. Recently, the large numbers of vehicles have been stolen, and an antitheft device has been developed. An indicator lamp, which indicates the working status of the antitheft device, is located in the instrument panel, above the instrument panel, or on a sun visor. The indicator lamp is also used as a warning lamp to a person who approaches the vehicle. In this case, the indicator lamp should be highly visible. Thus, the indicator lamp is preferably located in the door, especially in upper part of a door trim. The indicator lamp requires high reliability and low power consumption during times when the engine of the vehicle is stopped. Therefore, a light emitting diode (LED) is desirable to be used for the indicator lamp because the LED works with low power consumption.

The door of the vehicle includes a lot of devices, for example, a glass, a glass elevation device, a door lock device, and an audio device. The door trim includes an inside door handle and a storage space for maps and magazines. The door trim also includes thick buffering parts for protecting a passenger and for insulating noise. Therefore, space for installing the indicator lamp in the door or the door trim is restricted by many devices and parts. Because the door trim is elaborately designed parts, the indicator lamp is limited by the door trim design in its size and its attachment structure. In case the indicator lamp is located on the upper part of the door trim, the indicator lamp is required to be waterproofed because rainwater falls on the upper part of the door trim when the door or window is open.

As shown in FIG. 1, a light source of a lamp unit 1 is an LED lamp 2. The LED lamp 2 includes an LED chip (not shown) that is bonded on a metal lead frame 3 and is enclosed by epoxy resin. The lamp unit 1 includes a bezel 7 on a top of a casing 8. The lead frame 3 extends to a connector 5 through a circuit part 4.

The lamp unit 1 needs space or an insulating material therein to avoid electrical short. Thus, the lamp unit 1 needs to have a wide housing. In case that the lamp unit 1 is longer than the lead frame 3, the lead frame 3 has to be extended by a connection 6. When the lamp unit 1 includes a printed substrate, the lamp unit 1 needs to have a wide housing. The epoxy resin of the LED lamp 2 is visible as a light emitting part, the appearance of the light emitting part is less attractive. Because the LED lamp 2 is located near the bezel 7 of the lamp unit 1, water can directly come in the LED lamp 2 when it rains. Thus, the lamp unit 1 is not water proof.

SUMMARY OF THE INVENTION

An object of the invention is to overcome the above-mentioned limitations. An indicator lamp according to the present invention allows an attachment to a door trim. The indicator lamp can protect its light source from rainwater.

Exemplarily, the invention is enabled as an indicator lamp for providing a warning signal to a person who approaches the vehicle to steal a vehicle. The indicator lamp includes a lamp unit including a light emitting diode (LED). The indicator lamp includes a light guide conveying light from the LED. The light guide is shaped in a portion to cover at least a part of the lamp unit in a manner that prevents contaminations from entering the lamp unit.

In another aspect of the invention, the invention is exemplarily a light guide for a vehicle indicator lamp assembly having a lamp unit with at least one light emitting diode (LED). The light guide includes a first portion that is shaped to cover at least a portion of the lamp unit in a manner that prevents contaminations from entering the lamp unit. The light guide also includes a second portion that is shaped to convey light emitted from the at least one light emitting diode (LED) in the lamp unit to be light emitted from the vehicle lamp assembly.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

FIG. 9 is a perspective view of a door trim which the indicator lamp is exemplarily applied to.

DETAILED DESCRIPTION OF THE PREFERRED EMBODIMENTS

First Exemplary Embodiment

Figure 3:
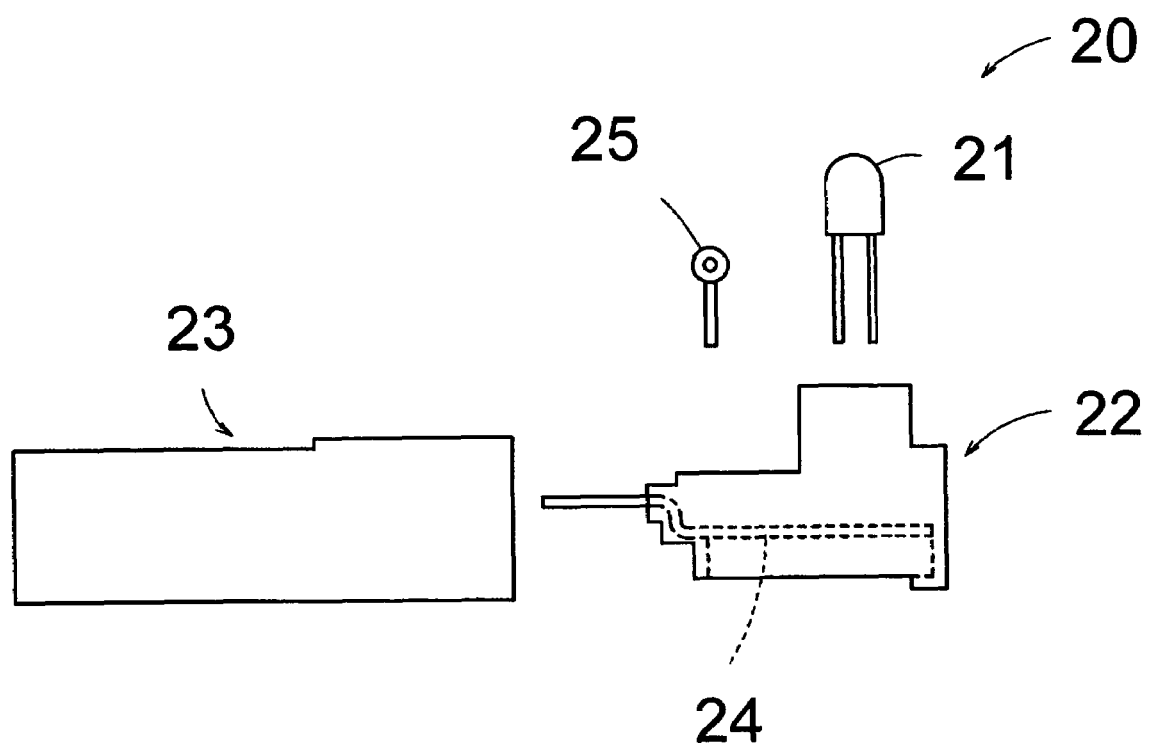
FIG. 3 is an exploded view of a lamp unit.
Figure 4:
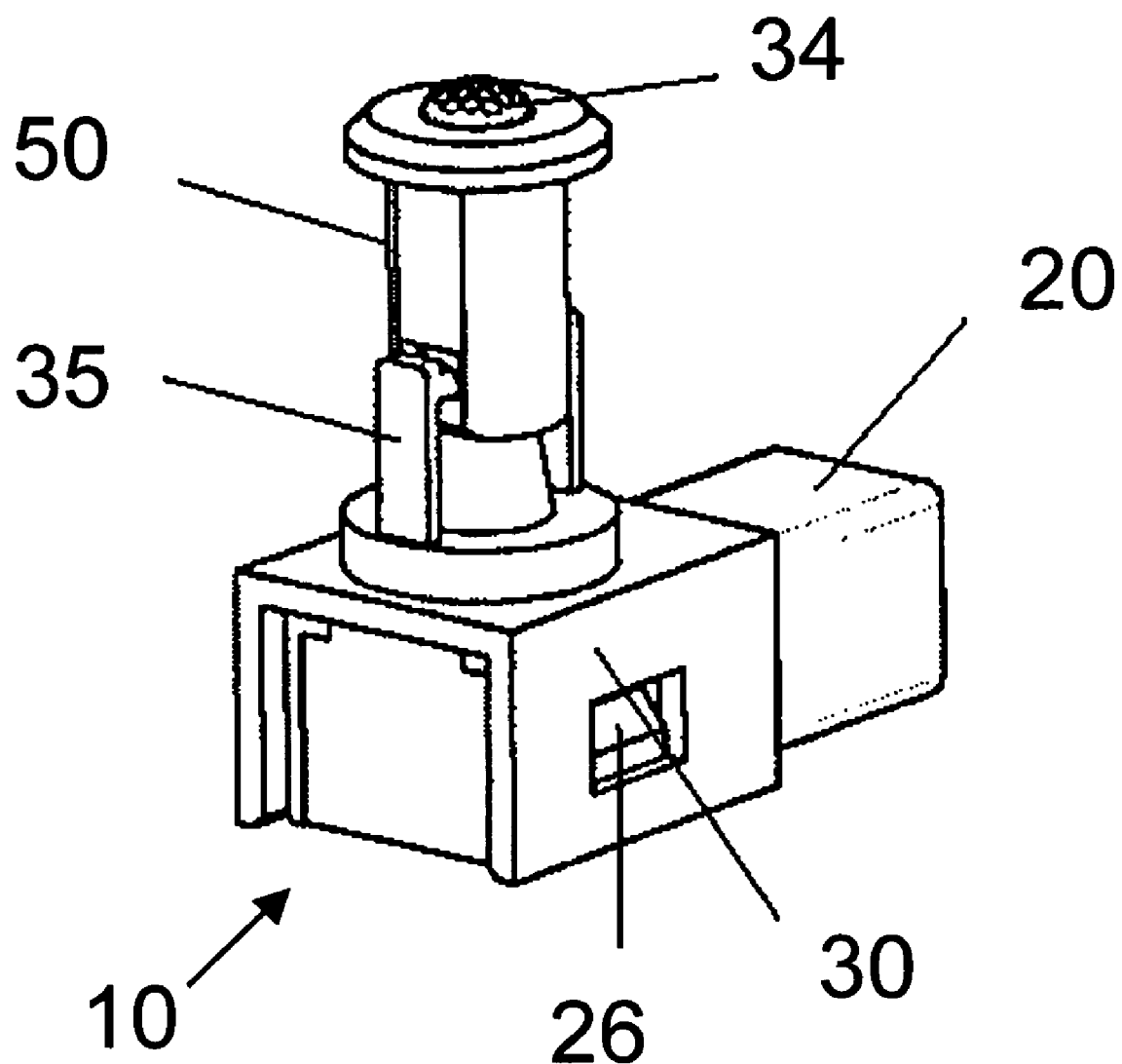
FIG. 4 is a perspective view of the indicator lamp

Referring to FIGS. 3 and 4, an indicator lamp 10 includes a lamp unit 20, a light guide 30 and a design bezel 50. The lamp unit 20 includes a casing 22 and a cover 23. The casing 22 includes a circuit 24 that mounts a circuit part 25 and an LED lamp 21. The casing 22 includes engaging claws 26 that engage with the light guide 30. The cover 23 covers the casing 21. The LED lamp 21 includes an enclosed type LED that encloses an LED chip (not shown) by epoxy resin. The LED lamp 21 can also includes a surface mounted diode (SMD)

type LED instead of the enclosed type LED. The LED lamp 21 can mount a single LED chip or multiple LED chips. The LED lamp 21 can also mount a single color LED chip or multiple colors LED chips. The SMD type LED can mount not only a 0.3-mm-square chip (small chip) but also a 1.0-mm-square chip (large chip). A large chip LED can apply a larger amount of current and emits a brighter light than that of small chip.

Figure 5:
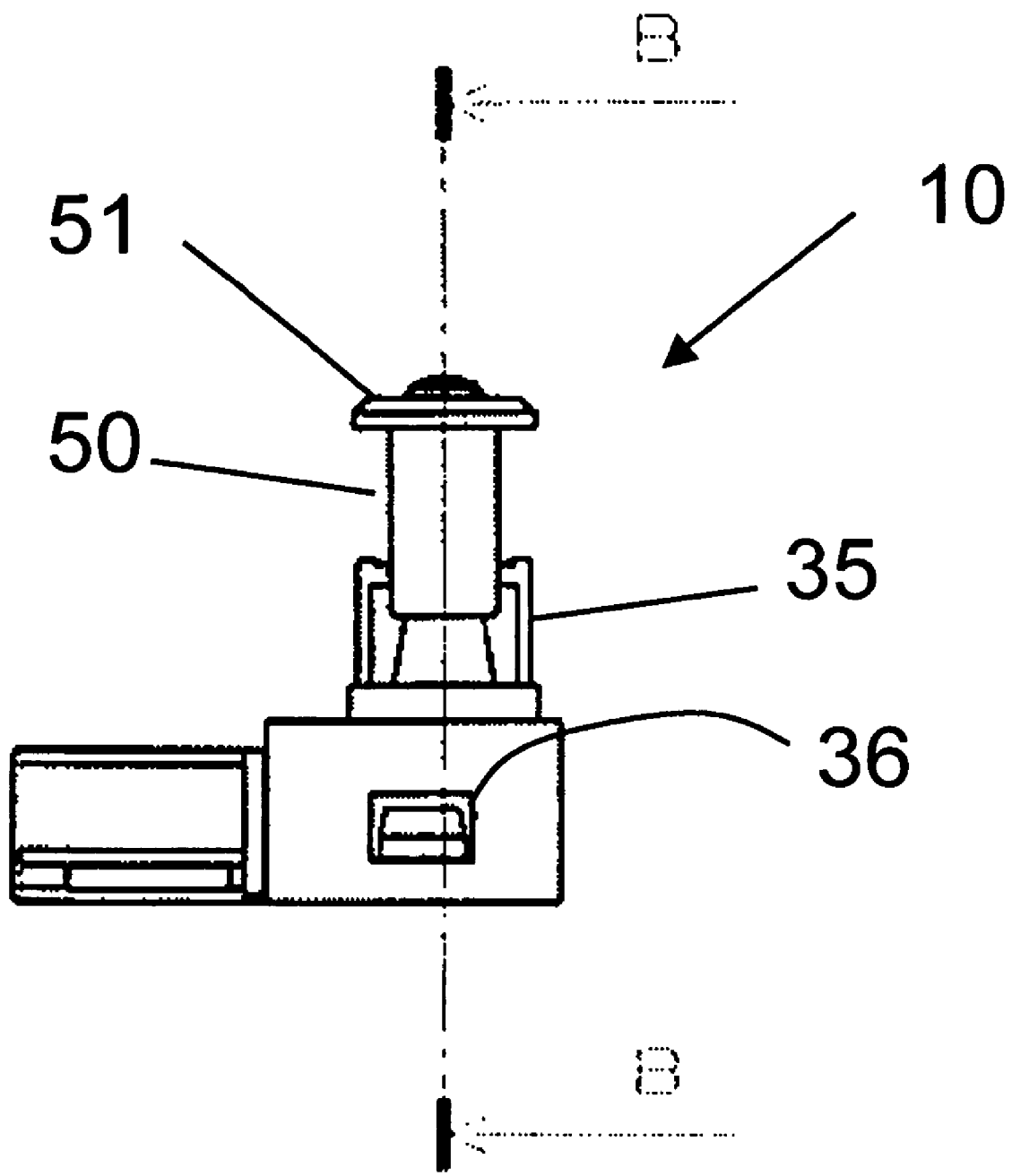
FIG. 5 is a side view of the indicator lamp in FIG. 4.
Figure 6:
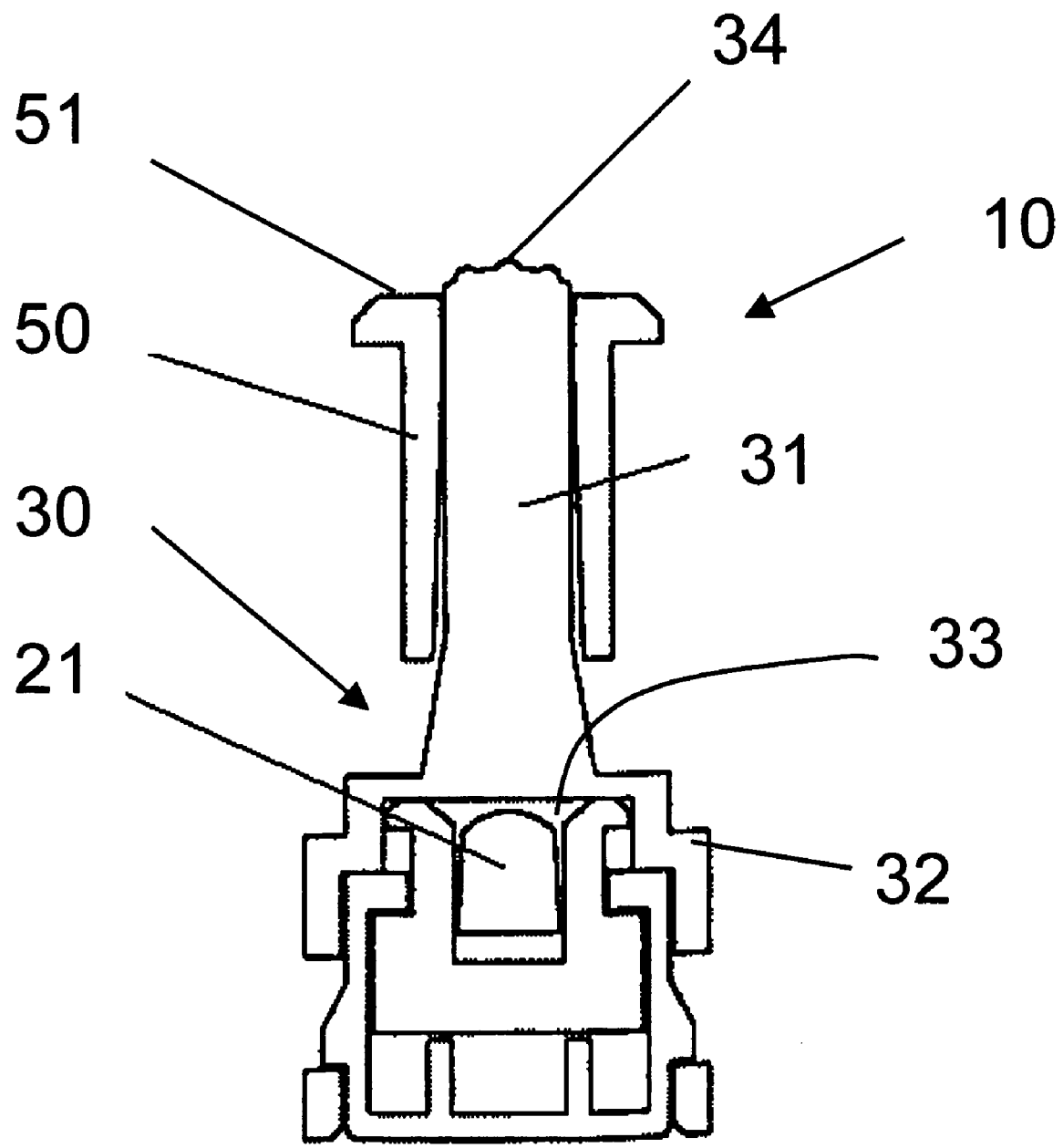
FIG. 6 is a cross sectional view of the indicator lamp 1 at B-B line of FIG. 5.
Figure 7:
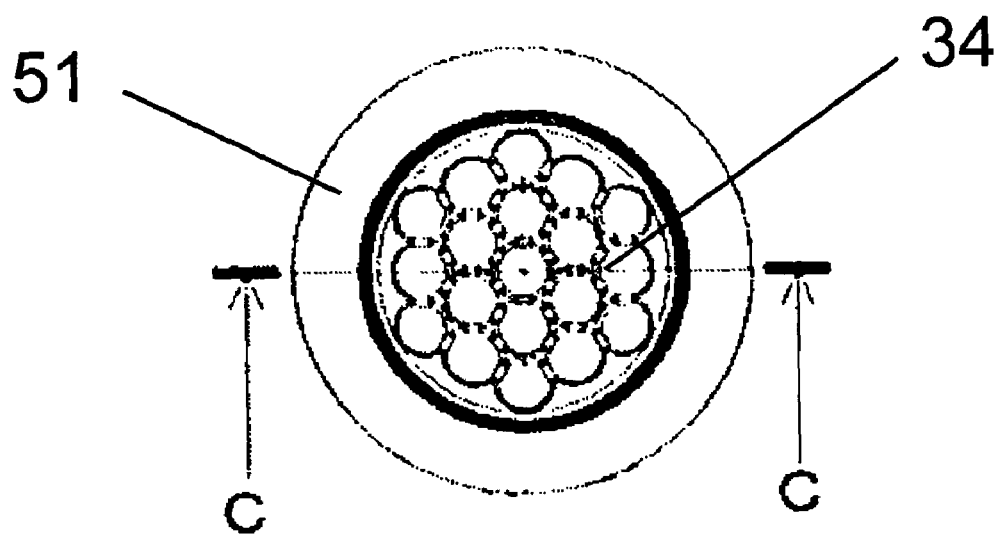
FIG. 7 is an enlarged view of a light emitting part of the indicator lamp.
Figure 8:
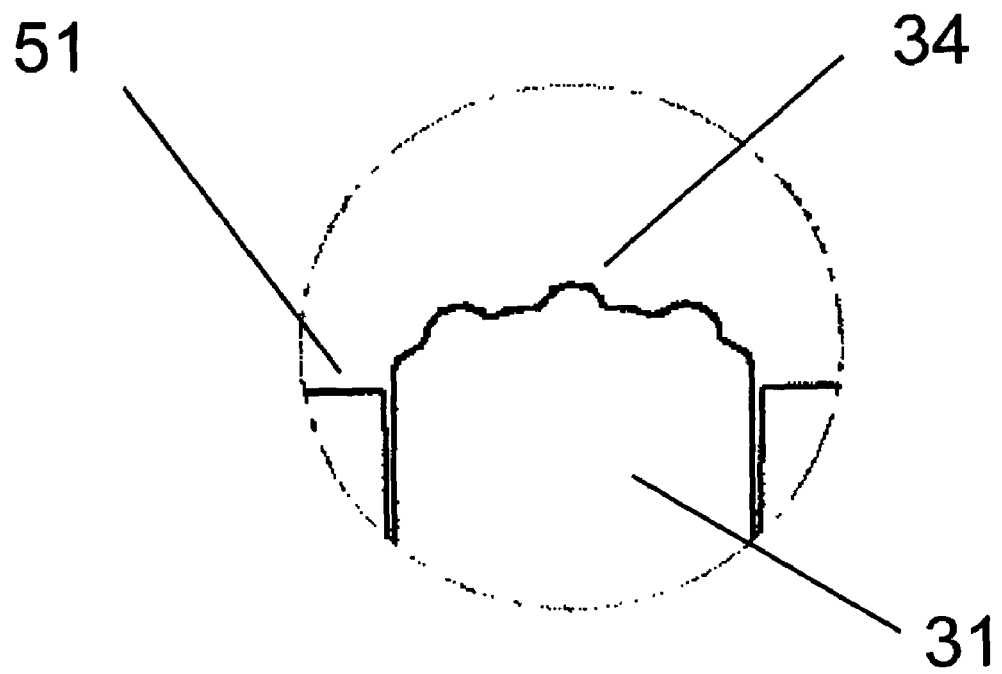
FIG. 8 is a partial view of the indicator lamp at C-C line of FIG. 7.
Figure 9:
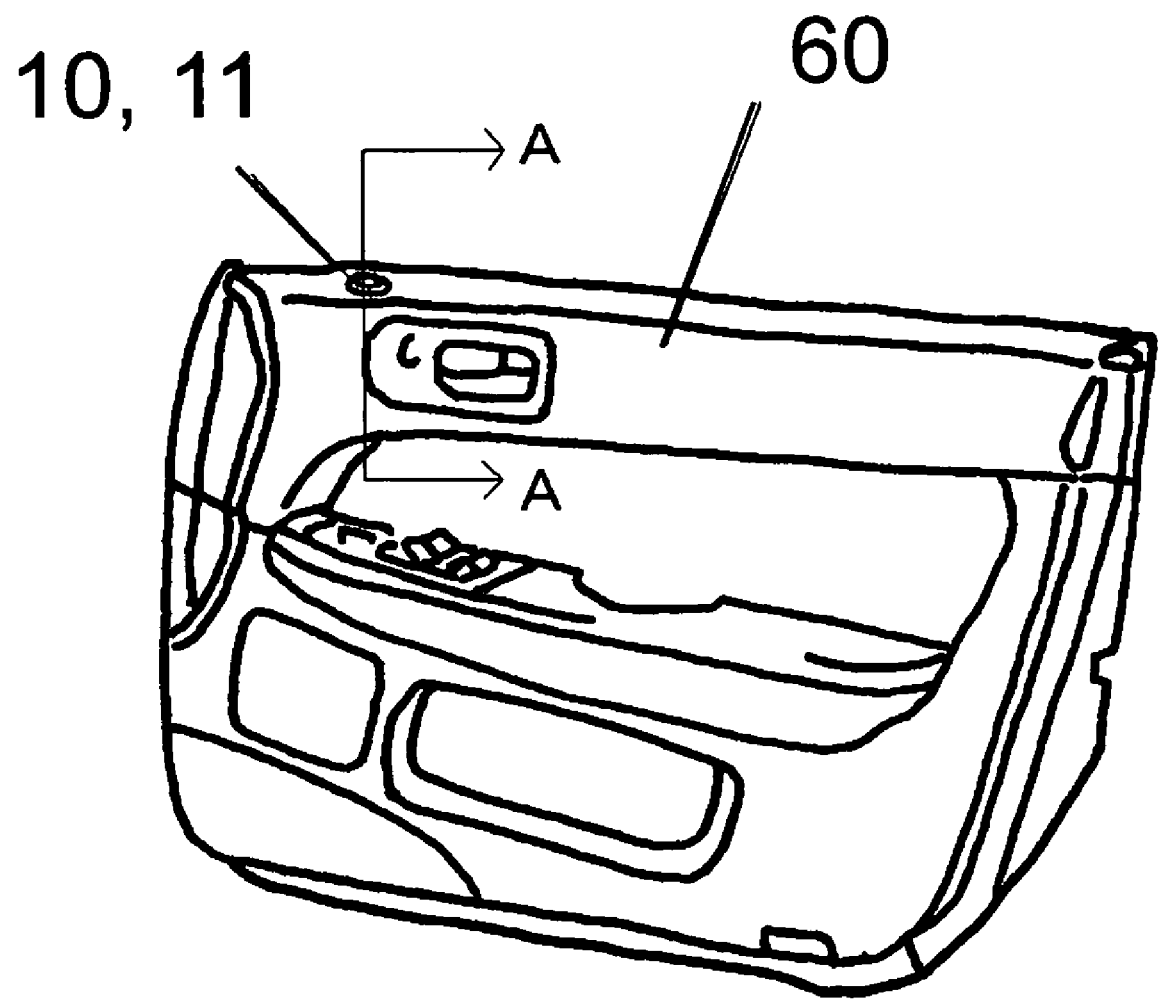

As shown in FIGS. 4-6, the light guide 30 includes an elongated portion 31 and a cover portion 32. The elongated portion 31 and the cover portion 32 of the light guide 30 are integrally formed, exemplarily from polycarbonate resin. The elongated portion 31 receives a light from the LED lamp 21 at a bottom end 33 that connects with the cover portion 32. Then, the elongated portion 31 conveys the light from the LED lamp 21 to a light emitting end 34. Thus, the light from the LED lamp 21 is emitted at the light emitting end 34. As shown in FIGS. 7 and 8, the light emitting end 34 includes protrusions. These protrusions function as a diffuser that diffuses the light from the LED lamp 21. Hooks 35 of the light guide 30 engages with the design bezel 50. The engaging claws 26 of the lamp unit 20 engage with engaging holes 36 of the cover portion 32 of the light guide 30. When the light guide 30 connects with the lamp unit 20, the LED lamp 21 is located between the engaging hole 36 and the bottom end 33 of the elongated portion 31. Thus, the cover portion 32 of light guide 30 covers the LED lamp 21 of the lamp unit 20. Therefore, the light guide 30 prevents contaminations from entering the lamp unit 20.

Figure 1:
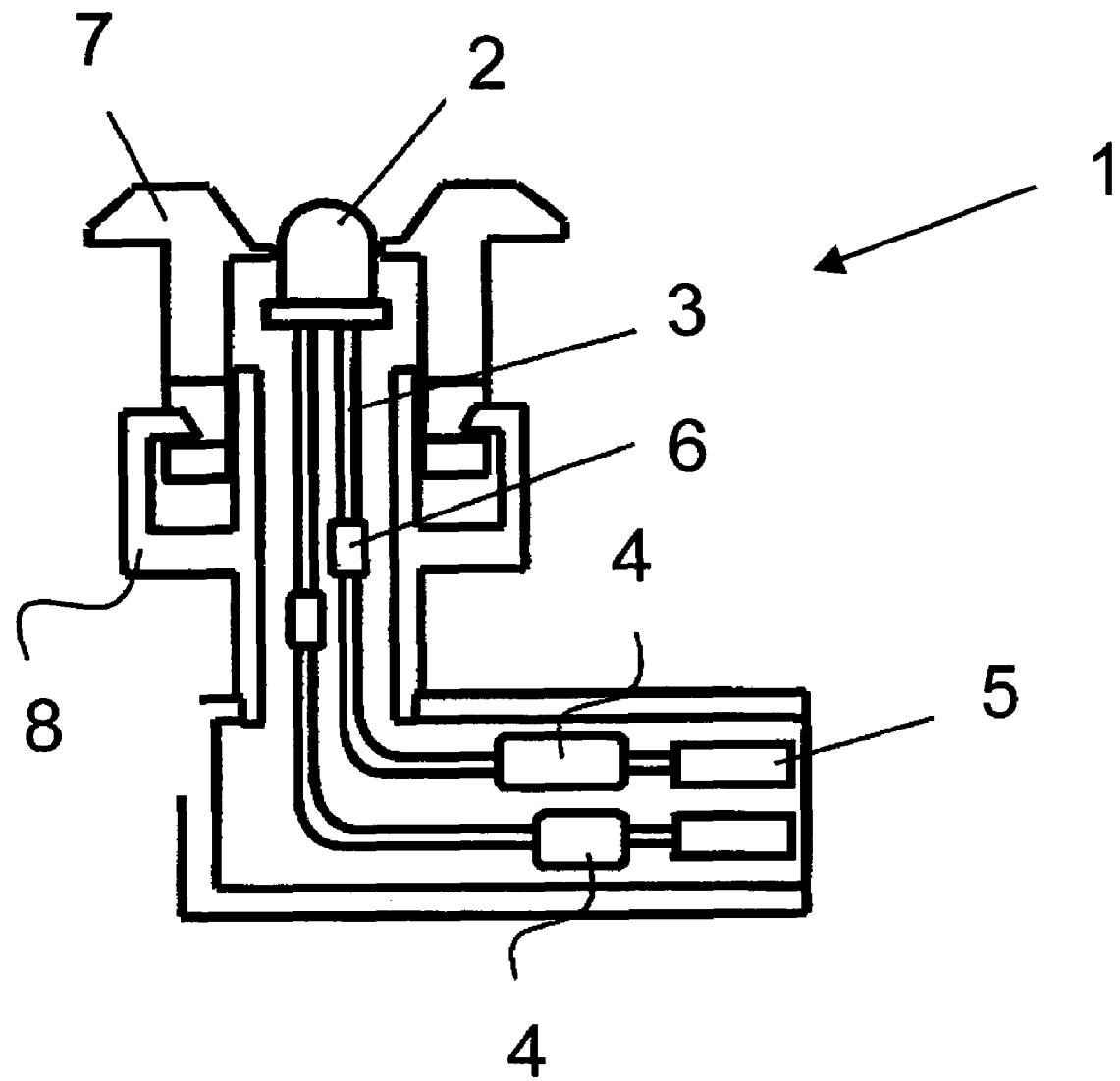
FIG. 1 is a prior art of an indicator lamp.
Figure 2:
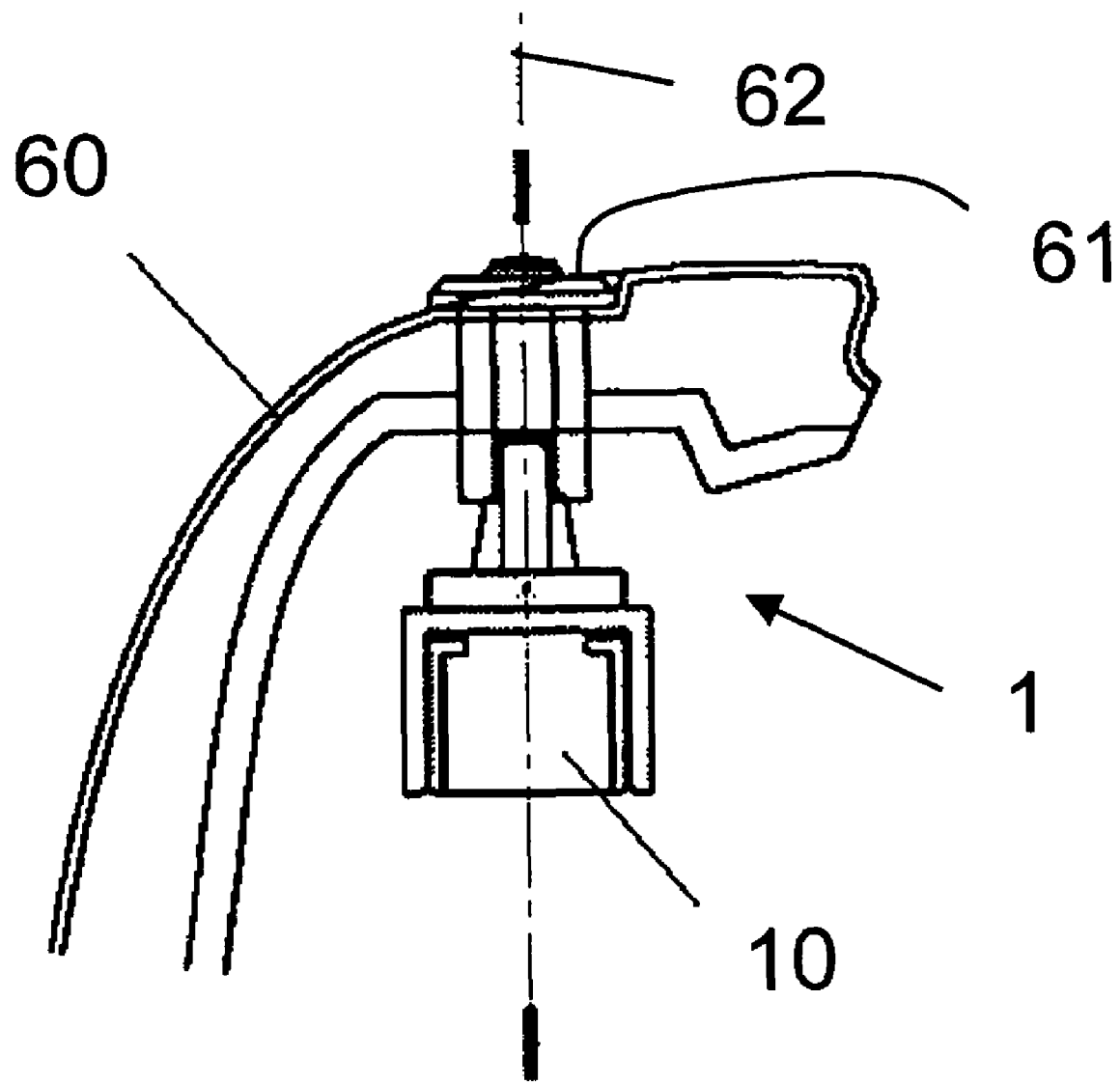
FIG. 2 is a sectional view at A-A line of FIG. 9.

Still referring to FIGS. 4-6, the design bezel 50 is formed in a tubular shape and formed exemplarily from ABS resin. The design bezel 50 includes a rim 51 at a top portion of the design bezel 50. As shown in FIG. 2, the design bezel 50 is inserted into an attachment hole 61 that is located at a top part of a door trim 60. The rim 51 is designed in accordance with a design of the door trim 60.

As shown in FIGS. 2, 4 and 6, an integral combination of the lamp unit 20 and the light guide 30 is set in a door trim 60. The design bezel 50 is downwardly inserted into the attachment hole 61 of the door trim 60. Then, the rim 51 of the design bezel 50 engages the attachment hole 61 of the door trim 60. Thus, the design bezel 50 is vertically fixed on the door trim 60 because a central axis 62 of the attachment hole 61 is vertical on the top part of the door trim 60. Then, the design bezel 50 is inserted by the elongated portion 31 of the light guide 30 and fixed to the light guide 30 by hooks 35 of the light guide 30. Thus, the integral combination and the design bezel 50 are engaged and attached to each other by the hooks 35 of the light guide 30. Thus, the indicator lamp 10 is vertically fixed in the door trim 60. Because the cover portion 32 covers the LED lamp 21, the light guide 30 deflects water when water comes down from the design bezel 50 or the light emitting end 34 of the light guide 30. Therefore, the indicator lamp 10 is waterproof.

Second Exemplary Embodiment

Figure 10:
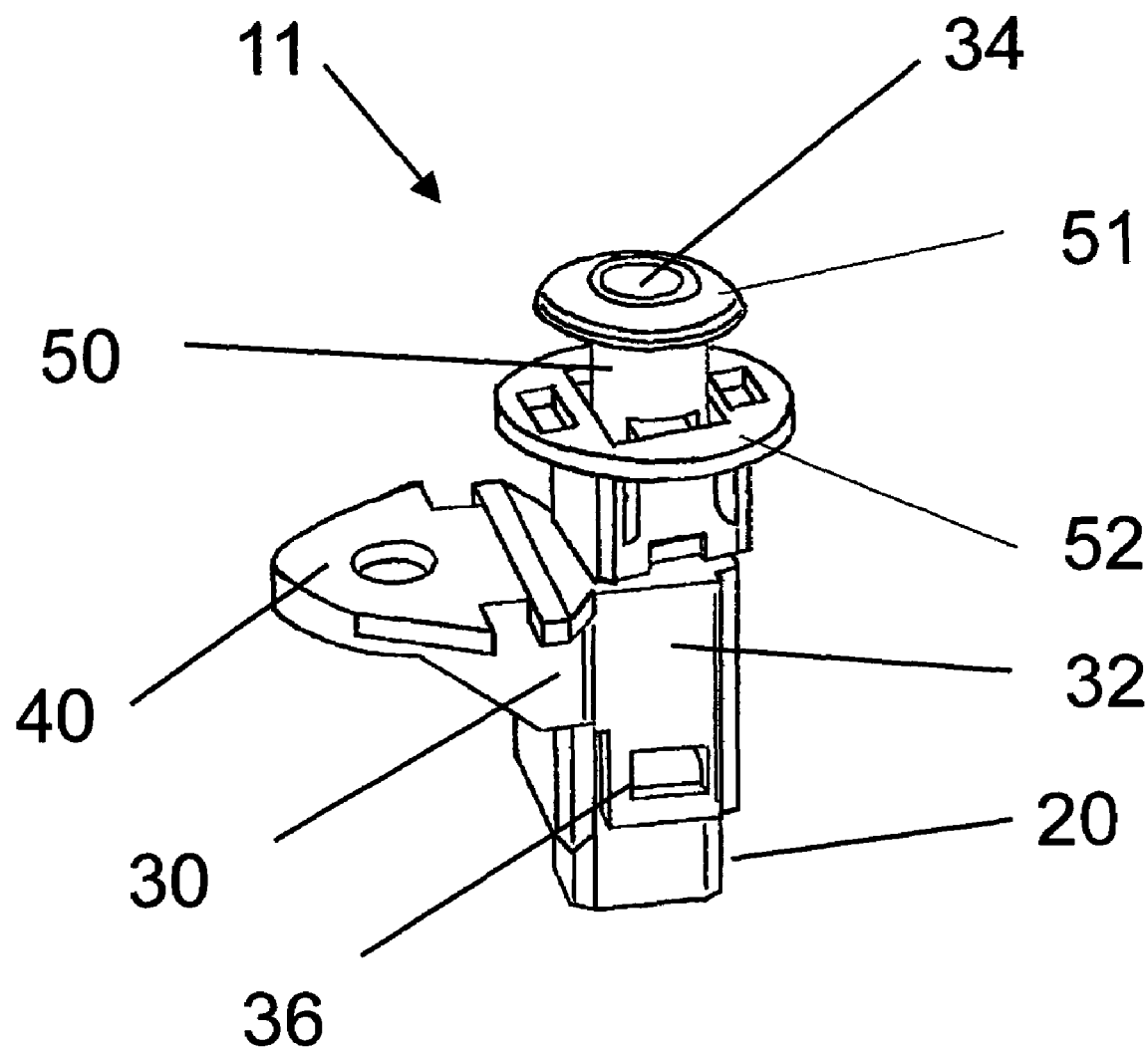
FIG. 10 is a perspective view of the indicator lamp.
Figure 11:
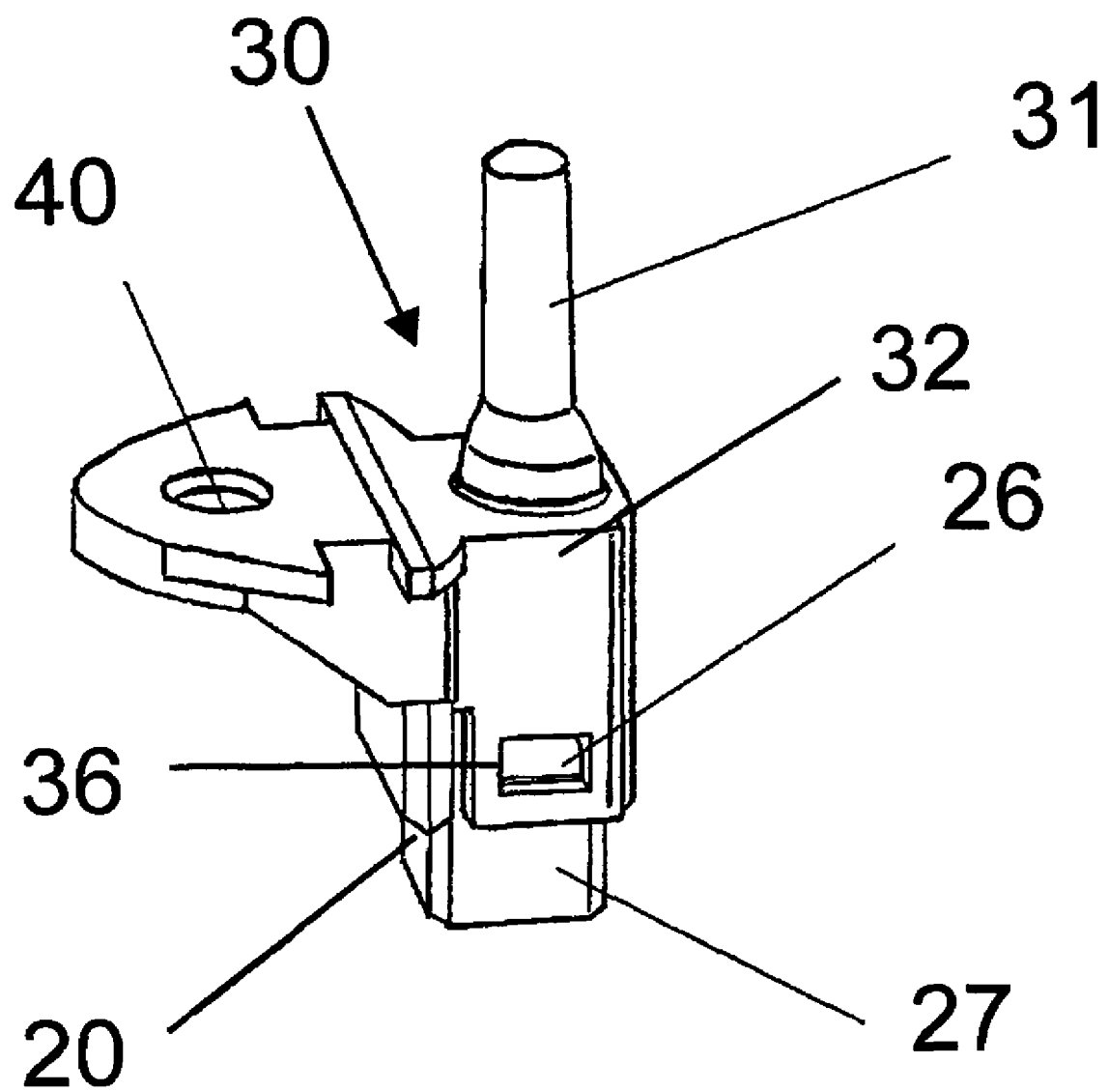
FIG. 11 is a perspective view of a lamp unit with a light guide.
Figure 12:
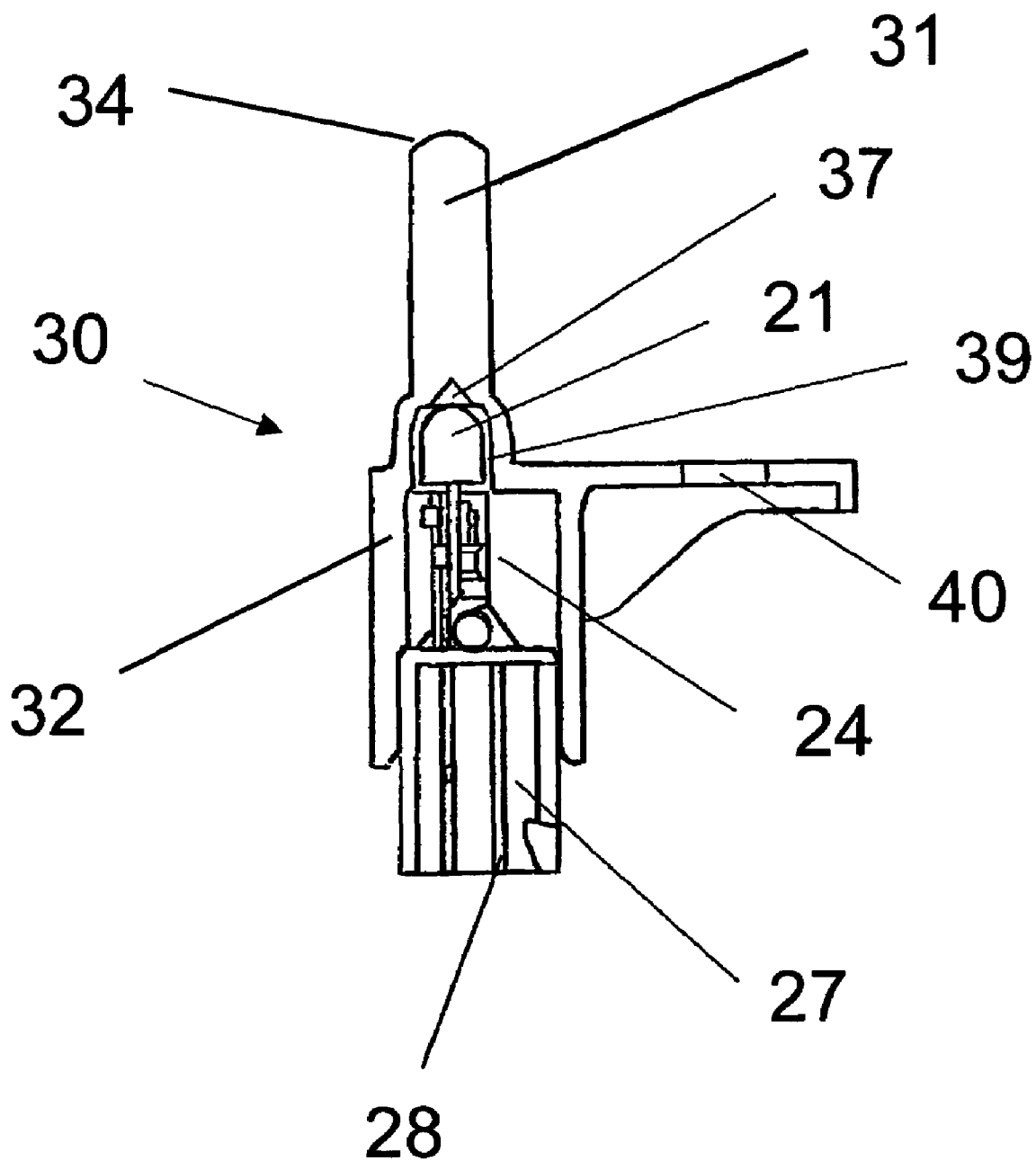
FIG. 12 is a cross sectional view of the indicator lamp in FIG. 11.

As shown in FIGS. 10-12, an indicator lamp 11 includes a design bezel 50, a light guide 30 and a lamp unit 20 from the top. The indicator lamp 11 is fixed to a door trim 60. The lamp unit 20 includes an LED lamp 21, a circuit 24, which includes a zener diode and a resistance, and a connector casing 27, which includes lead frames 28 and connects with other connectors. The connector casing 27 includes engaging claws 26 to connect with the light guide 30.

The light guide 30 includes an elongated portion 31 and a cover portion 32. The elongated portion 31 and the cover portion 32 are integrally formed from acrylic resin. The elongated portion 31 is formed in a cylindrical shape and includes a cavity 37 at a bottom end and a light emitting end 34 at a top end. The light emitting end 34 is formed in a plane face in this embodiment. The cavity 37, which is shaped in a conic notch, receives a light from the LED lamp 21. The bottom end of the elongated portion 31 can also be a plane face to receive the light from the LED lamp 21. The elongated portion 31 of the light guide 30 introduces the light from the LED lamp 21 to the light emitting end 34. Then, the light emitting end 34 emits the light from the LED lamp 21. The light emitting end 34 can be finished with a light diffusing treatment. In this case, the light from the light emitting end 34 is well diffused and observed in an equal illumination. The elongated portion 31 can be finished with a light reflecting treatment on a side wall of the elongated portion 31. In this case, a light from the LED lamp 21 is well reflected in the elongated portion 31 and introduced to the light emitting end 34.

The cover portion 32 partially covers the lamp unit 20. The cover portion 32 of the light guide 30 includes a hollow portion 39 and a protruding part 40. The hollow portion 39 accommodates the LED lamp 21 and the circuit 24. The protruding part 40, which protrudes from the light guide 30, fixes the indicator lamp 11 to the door trim 60 by a screw (not shown). The cover portion 32 also includes engaging holes 36 to connect with the engaging claws 26 of the lamp unit 20. The engaging holes 36 locate in a lower part of the cover portion 32, which is below the LED lamp 21. Thus, the light guide 30 covers the LED lamp 21 at the hollow portion 39 and connects with the lamp unit 20 at the engaging holes 36. Therefore, because water from the top of the light guide 30 does not reach the LED lamp 21, the indicator lamp 11 is waterproof.

Referring to FIGS. 2 and 10, the design bezel 50 is formed in a tubular shape. The design bezel 50 is inserted into an attachment hole 61, which is formed in a top part of the door trim 60, from the above of the door trim 60. The design bezel 50 includes a rim 51 at a top end of the design bezel 50. The rim 51 is designed in accordance with a design of the door trim 60. The rim 51 engages the attachment hole 61 of the door trim 60. The design bezel 50 is vertically fixed to the door trim 60 because the central axis 62 of the attachment hole 61 is vertical. The design bezel 50 is also fixed to an inner wall of the door trim 60 by a supporter 52. Thus, the design bezel 50 is vertically and stably fixed to the door trim 60 by the rim 51 and the supporter 52.

The lamp unit 20 is connected with the light guide 30 by the engaging claws 26. Then, the elongated portion 31 of the light guide 30 is inserted into the design bezel 50. The light emitting face 34 of the elongated portion 31 is exposed at the attachment hole 61 of the door trim 60. Thus, the light from the LED lamp 21 can be observed at the door trim 60. The protruding part 40 of the light guide 30 is fixed to the door trim 60 by the screw. Thus, the indicator lamp 11 is completely attached to the door trim 60. When water comes down from the top of the indicator lamp 11, the water does not reach the LED lamp 21 because the cover portion 32 of the light guide 30 covers the LED lamp 21 and the light guide 30 connects with the lamp unit 20 below the LED lamp 21.

The present invention is not limited to the above-mentioned exemplary embodiments. The engaging claws 26 can be formed on the light guide 30. The indicator lamp 10, 11 can be attached in a passenger seat or an instrument panel of a vehicle.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A vehicle lamp, comprising:
   a light emitting diode (LED);
   a lamp unit including the (LED); and
   a light guide that conveys light emitted from the LED,
   wherein the light guide is formed on at least a part of the lamp unit and prevents contamination from entering the lamp unit.

2. The lamp of claim 1, wherein the light guide includes an elongated portion for the conveying of light, the vehicle lamp further comprising:
   a bezel having a channel into which the elongated portion of the light guide is inserted.

3. The lamp of claim 1, wherein the light guide serves as an upper component of the vehicle lamp, the light guide being shaped such that the lamp unit fits into an end of the light guide in a manner that water is deflected from entering the lamp unit.

4. The lamp of claim 1, wherein the light guide is comprises an engaging portion for detachably engaging with the lamp unit.

5. The lamp of claim 1, wherein an emitting end of the light guide includes a surface treatment for diffusing light being emitted therefrom.

6. The lamp of claim 1, wherein the lamp unit includes a plurality of LEDs.

7. The lamp of claim 1, wherein at least a portion of a side wall of the light guide is provided with a light reflecting treatment.

8. The lamp of claim 1, wherein the light guide comprises a protruding part serving to attachably mount the vehicle lamp to a surface.

9. The lamp of claim 2, wherein the light guide comprises an engaging portion for detachably engaging with the bezel.

10. The lamp of claim 2, wherein the bezel comprises a shape such that the bezel partially slides through a hole in a mounting surface.

11. A light guide for a vehicle lamp assembly having a lamp unit with at least one light emitting diode (LED), the light guide comprising:
    a first portion formed on at least a portion of the vehicle lamp assembly, said first portion preventing contaminants from entering the lamp unit; and
    a second portion shaped to convey light emitted from the at least one light emitting diode (LED) in the lamp unit to be light emitted from the vehicle lamp assembly.

12. The light guide of claim 11, wherein the second portion includes a cavity into which said lamp unit is at least partially insertable.

13. The light guide of claim 11, wherein the light guide serves as an upper component of the vehicle lamp assembly, the light guide being shaped such that the lamp unit fits into an end of the light guide in a manner that water is deflected from entering the lamp unit.

14. The light guide of claim 11, further including an engaging portion for detachably engaging with the lamp unit.

15. The light guide of claim 11, wherein an emitting end of the light guide includes a surface treatment for diffusing light being emitted therefrom.

16. The light guide of claim 11, wherein at least a portion of a sidewall of the light guide is provided with a light reflecting treatment.

17. The light guide of claim 11, further including a protruding part serving to attachably mount the vehicle lamp assembly to a surface.

18. The light guide of claim 11, further including an elongated portion for the conveying of light, wherein the vehicle lamp assembly further comprises a bezel having a channel into which the elongated portion of the light guide is inserted.

19. The light guide of claim 18, further including an engaging portion for detachably engaging with the bezel.

20. A method of preventing contaminants from entering a lamp unit in a vehicle light, the lamp unit including a light emitting diode (LED), the method comprising:
    providing a light formed on at least a part of the lamp unit, said light guide preventing contaminants from entering the lamp unit.

* * * * *